Dec. 14, 1926.
E. W. ACKERMAN ET AL
1,610,644
REBOUND TAKE-UP DEVICE
Filed April 19, 1926    2 Sheets-Sheet 1
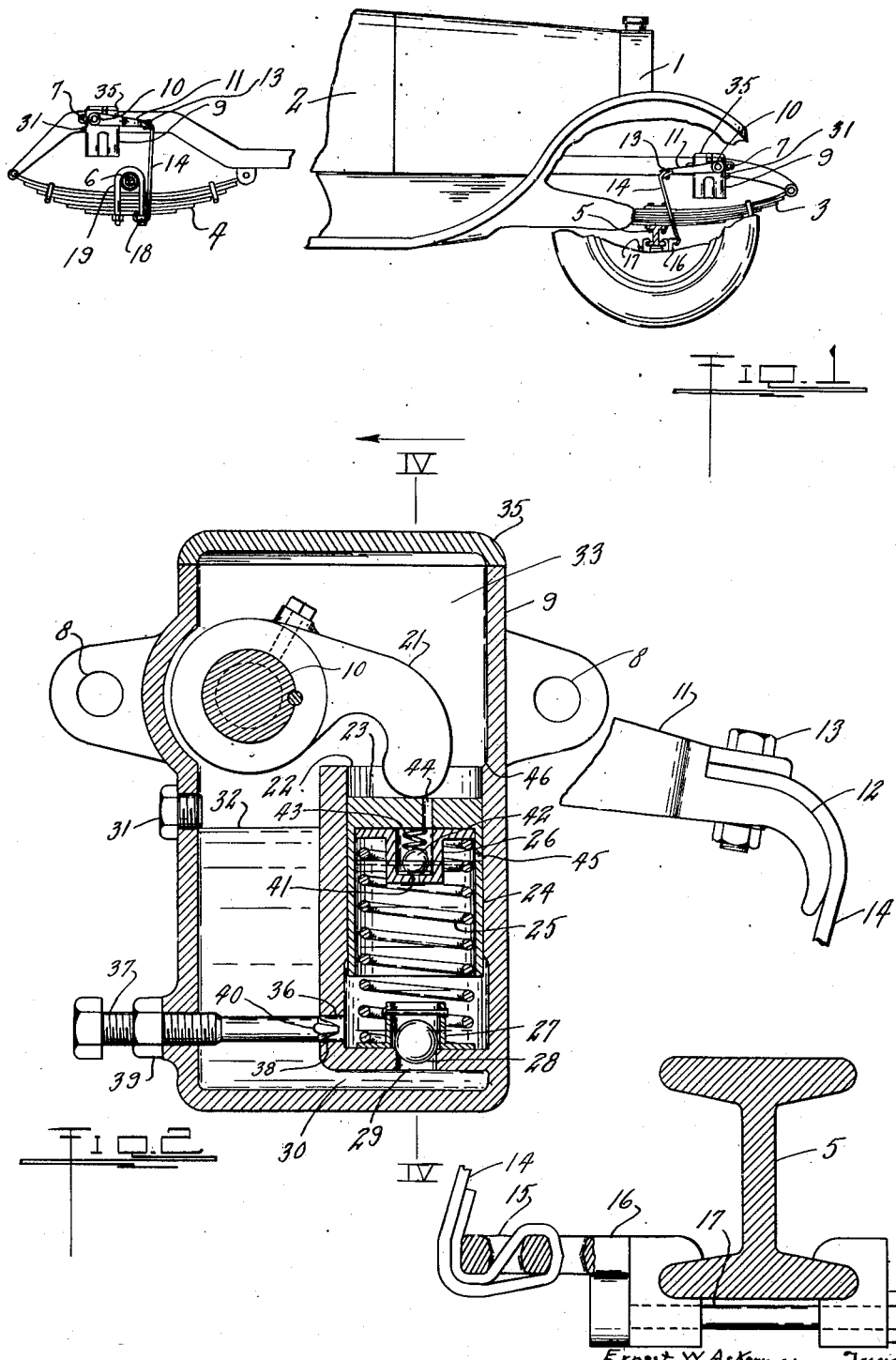
Inventors
Ernest W. Ackerman
Griffith C. Nicholson
By Leo Kirk
Attorney Dec. 14, 1926.
E. W. ACKERMAN ET AL
1,610,644
REBOUND TAKE-UP DEVICE
Filed April 19, 1926    2 Sheets-Sheet 2
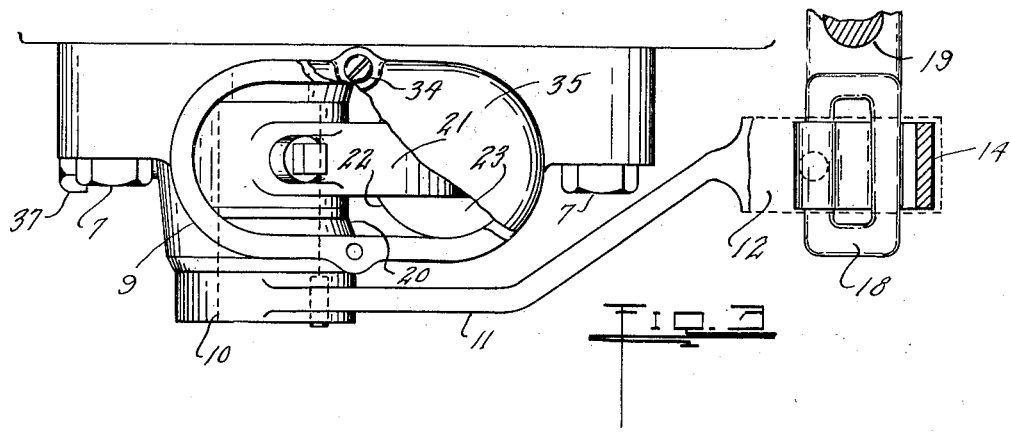
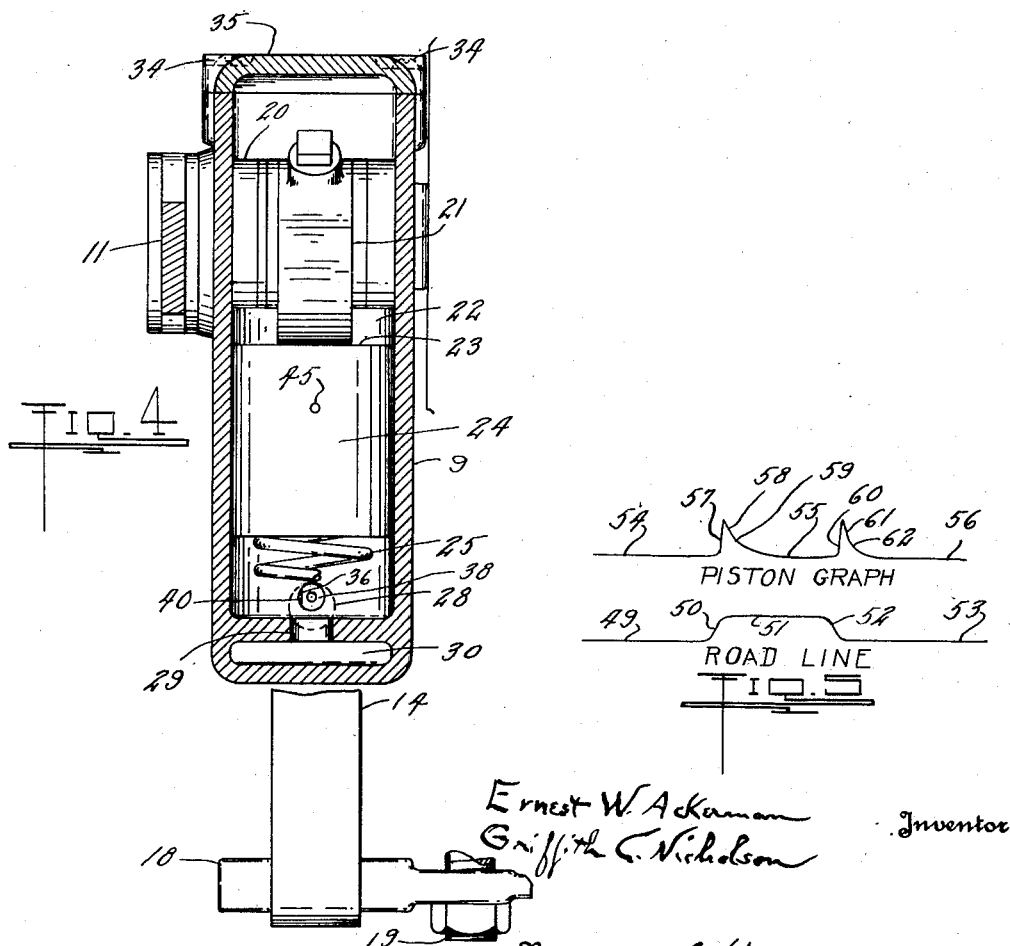

Patented Dec. 14, 1926.

1,610,644

UNITED STATES PATENT OFFICE.

ERNEST W. ACKERMAN AND GRIFFITH C. NICHOLSON, OF MONROE, MICHIGAN.

REBOUND TAKE-UP DEVICE.

Application filed April 19, 1926. Serial No. 103,038.

This invention relates to retarding the relative movement between yieldably connected bodies, more particularly as exposed to concussion.

This invention has utility when incorporated in rebound absorbers for motor vehicles.

Referring to the drawings:

Fig. 1 is a fragmentary view of a motor vehicle having an embodiment of the invention incorporated therewith;

Fig. 2 is an enlarged view, with parts broken away, of one of the devices on the vehicle of Fig. 1;

Fig. 3 is a plan view, with parts broken away, of the device herein;

Fig. 4 is a view on the line IV—IV, Fig. 3, looking in the direction of the arrow;

Fig. 5 is a view of a road line distortion and piston position curved as responsive thereto.

Motor vehicle 1 is shown as having body 2 yieldably carried and spaced by springs 3, 4, from axles 5, 6. Bolts 7 through eyes 8 from container or housing 9 serve rigidly to mount this housing 9 with the vehicle body 2 or motor vehicle chassis frame. Protruding from this housing 9 is rock shaft 10 having fixed thereon arm 11 terminating in seat 12 through which extends bolt 13 anchoring flexible connection 14 with such arm 11. This flexible connection 14 is shown as threaded through eye 15 of bracket 16 anchored by bolt 17 in fixed position as to the axle 5. Instead of bracket 16 at the axle 5, there may be connection of the flexible member 14 by bracket 18 assembled with U-bolts 19 as mounting the spring 4 with said axle 6.

The housing 9 has bearing 20 supporting the rock shaft 10. Fixed with this rock shaft 10 and in the housing 9, is arm 21 extending over cylinder 22 integral with the housing 9. This arm 21, as extending over the cylinder 22 rests upon end 23 of piston having depending skirt extension 24 therefrom. This piston 23, 24, is normally thrust toward the arm 21 by compression helical spring 25. This spring 25, at its upper portion engages cage 26; and at its lower portion engages cage 27. The cage 27 houses therein check ball 28 normally resisting flow from the cylinder 22 below the piston 23 by way of port 29 into reservoir 30 in the housing 9 exterior of the cylinder 22.

In this housing 9, by removing plug 31, there may be poured thereinto incompressible liquid 32 to a level below this plug 31. This leaves an air chamber 33 above the liquid 32 which air chamber is at atmospheric pressure. Bolts 34 anchor lid 35 in position on this housing 9 although its mounting is not necessarily air tight, but one to keep out foreign material, while still allowing the device to act freely independently of pressure disturbances for pressure maintenance therein as to the air chamber 33.

The lower portion of the cylinder 22 has port 36. From exterior of the housing, screw 37 may be adjusted to have its tapered end 38 vary the clearance as to said opening 36, and in so operating as a needle valve, control seepage from the cylinder 22 as the piston 23, 24, is depressed against the action of the spring 25 in compressing such spring 25. Lock nut 39 may hold this screw or needle valve 37 in position, as adjusted. This valve may not be set up for total closing of this port 36 for the reason that flattened portion 40 in the region of the tapered portion 38 insures leakage at all times from this cylinder 22.

While the device herein is one normally operating with a thin liquid, as glycerin, or glycerin and wood alcohol, in the event such device might be charged with other liquid tending to flow less readily under low temperature, provision is made to avoid disaster from such cause in the provision of the cage 26. This cage 26 has port 41 normally closed by ball 42 as a check valve held by spring 43 to maintain all normal operating pressures in the cylinder 22. In the event such pressure is exceeded, the ball 42 is unseated from the port 41 and there is relief flow past this ball 42 by way of port 44 in the piston 23.

The piston 23, 24, in its reciprocation at all times when the arm 11 is released by slacking of the connection 14, tends to swing such arm 11 with the shaft 10. This permits the piston 23, 24, to follow the arm 21 in its ascent, and brings port 45 in the skirt 24 of the piston 23, into region 46 for intake of air in this skirted portion of the piston thereby providing a compressible gas filled chamber. This action relieves the suction which has unseated the valve 28 in this lifting action. As the load is again applied through the flexible connection for rocking the shaft 10 and the arm 21 in recompressing the spring 25, this approach of the arm 11 toward its normal approximately horizontal position, does not unseat the valve 42. It does bring about a retarded flow from the cylinder 22 by way of the port 36 as the valve 28 has been seated. This retarded flow of the incompressible medium 32 introduces a resistance to the travel of the arm 11 which is positive at the adjusted seepage rate at the port 36, were it not for the trapped quantity of air as supplied to the chambered piston by way of the port 45. This trapped quantity of air is a compressible medium and builds up its pressure at once according to the movement of the arm 11. As the arm 11 comes to rest, the seepage about the piston 23, as well as the seepage by way of the port 36 allows this trapped quantity of air to expand to a condition approximating the pressure of the head of the liquid 32 thereabove. This pressure is, of course, very low or practically nil, and means that this compressible medium, notwithstanding there is a load condition for holding the arm 11 at the normal position, maintains such device of this disclosure in position. When there is a tendency toward downward pull or slight fluctuations in vehicle travel, there is response to such, simply and readily independently of strain on the device. This means most easy smooth carrying of the vehicle as permitted by the springs 3, 4, as well as the pneumatic tires for such vehicle.

As the disturbance arises beyond the range of this floating action of the piston 23, 24, there is a free upward movement on the slacking of the connection 14 with unseating of the valve 28. As the load recovers, this, as hereinbefore described, means a quick travel of the arm 21 in compressing the gas in the piston which travel is slowed up by the incompressible medium with the rate of travel determined by the adjustment of the port 36. The slight rocking of the arm 11 with the pulsation response in the movement of the piston 23, may in practice have a tendency to reduce the volume of the compressible medium in this chambered piston. However, on the extreme movement of the arm 11 wherein the retarder action of the device is desired, the port 45 ascends to the region of the clearance 46 and there is a sucking in of replenishing air from the chamber 33 to thereby serve as a pump. Accordingly, in practice, this compressible medium is one retained in this co-operative relation of the disclosure.

Considering the vehicle as traveling along a road having smooth portion 49, the vehicle comes to an abrupt rise 50 in the road, thereafter travels over a smooth portion 51 and drop 52 returning to smooth portion 53, there being oscillation of the piston 23 sympathetically therewith. Coincident with the travel of the vehicle along the smooth portions 49, 51, 53, the piston may be stationary or have a slight freedom for movement as provided by the compressible medium in the regions 54, 55, 56 (Fig. 5). As the vehicle meets with concussion or sudden interference at the abrupt rise 50 in the roadline, the springs 3, 4, of the vehicle receive such concussion and the body 2 of the vehicle moves toward such springs in thus slacking the flexible connections 14. This allows the spring 25 to thrust the piston 23 abruptly upward as shown by line 57 (Fig. 5). In the recover therefrom, there is quite rapid movement downwardly at region 58 as allowed by the compressible medium and such downward movement is then slowed up at region 59 (Fig. 5). Similarly at the drop portion 52 in the road, there is again disturbance of the relation between the axles and the body of the vehicle with a slacking of the flexible connections 14 which allows the arms 11 to move upward rapidly, defining condition for piston movement as shown by region 60 (Fig. 5) from which there is again the initial or downward movement 61, tapered off for slower downward movement 62 as the rebound is taken up gradually and smoothly in the bringing of the vehicle to a smooth riding condition.

What is claimed and is desired to secure by United States Letters Patent is:—

1. A connector between an axle and a vehicle body carried from said axle by a spring comprising a container rigid with one thereof, a flexible connection from the other thereof, an arm from the container to which the flexible connection extends, and a connection between the arm and container including a reservoir having a liquid level therein, and a pneumatic pump having an intake port shiftable to above said level from therebelow for coming into port opening position.

2. A vehicle axle, a vehicle body spring spaced from said axle, and a hydro-pneumatic rebound retarder between said axle and body including a reservoir having a liquid level therein, and a pneumatic pump having an intake port shiftable to above said level from therebelow for coming into port opening position.

3. A vehicle rebound retarder embodying a housing having a cylinder, said housing having an air chamber into which the cylinder extends, and a piston in said cylinder providing an air chamber in said cylinder, there being a liquid medium below said air chamber.

4. A rebound retarder housing, a load receiving relatively shiftable member therefrom, a compressible spring retarder for the member, means providing a liquid dash-pot supplementing said spring compression means and determining a liquid level in said housing, and means including a member having a port co-operating in providing a pneumatic pump for supplementing said dash pot by intermittently bringing said port into a position above said liquid level from a submerged position.

5. A rebound retarder housing, a load receiving relative shiftable member therefrom comprising compressible and incompressible connection means between said member and housing, said incompressible means including a liquid determining a level in said housing, and said connecting means including a member having a port shiftable from submerged position to above the liquid level to serve in the operation of the connecting means as a pump for replenishing the means with a compressible medium.

6. A rebound retarder housing, a load receiving relatively shiftable member therefrom comprising incompressible liquid dashpot connecting means provided with a seepage, said housing having a liquid level therein, and a self replenishing compressible take-up for modifying the load resistance of the dash-pot connecting means including a member having a port shiftable in the dashpot operation from submerged position to above the level of the liquid in the housing.

7. A rebound retarder housing, a load receiving relatively shiftable member therefrom comprising incompressible liquid dashpot connecting means provided with a seepage, said housing having a liquid level therein, said dashpot including a cylinder in the housing opening above said liquid level, and self replenishing pneumatic means for modifying the load resistance of the dashpot connecting means including a member having a port shiftable out of said dashpot cylinder.

In witness whereof we affix our signatures.

ERNEST W. ACKERMAN.
GRIFFITH C. NICHOLSON.